United States Patent [19]

Zieve

[11] Patent Number: 4,895,322

[45] Date of Patent: Jan. 23, 1990

[54] SELF-CONTAINED APPARATUS FOR DE-ICING AIRCRAFT SURFACES USING MAGNETIC PULSE ENERGY

[76] Inventor: Peter B. Zieve, 5766-27th Ave. NE., Seattle, Wash. 98105

[21] Appl. No.: 98,283

[22] Filed: Sep. 18, 1987

[51] Int. Cl.$^4$ ............................................. B64D 15/18
[52] U.S. Cl. .............................. 244/134 R; 244/134 D
[58] Field of Search ............. 244/134 R, 134 A, 134 D

[56] References Cited

U.S. PATENT DOCUMENTS

| | | | |
|---|---|---|---|
| 3,549,964 | 12/1970 | Levin | 244/134 A |
| 3,672,610 | 6/1972 | Levin | 244/134 R |
| 3,779,488 | 12/1973 | Levin | 244/134 D |
| 4,458,865 | 7/1984 | Sandorff | 244/134 R |
| 4,629,149 | 2/1986 | Carson et al. | 244/134 R |
| 4,678,144 | 7/1987 | Goehner | 244/134 D |
| 4,690,353 | 9/1987 | Haslim | 244/134 D |

FOREIGN PATENT DOCUMENTS

505433  5/1939  United Kingdom ............ 244/134 R

*Primary Examiner*—Galen L. Barefoot
*Attorney, Agent, or Firm*—Graybeal, Jensen & Puntigam

[57] ABSTRACT

A modular, electromagnetic de-icing system, useful for aircraft, each module being self-contained and including an actuator coil which has a surface configuration which is substantially the same as the shape of the aircraft surface to be de-iced. Each module further includes an electrolytic capacitor which, when discharged, produces a current pulse through the actuator coil, as well as a power supply connected directly to the aircraft-voltage supply for charging the electrolytic capacitor to a selected level, and an electronic switch for selectively connecting the capacitor to the coil when the voltage on the capacitor reaches a selected level. The current through the coil results in a magnetic force pulse which acts on the metal skin of the aircraft to debond and shatter the ice therefrom.

13 Claims, 10 Drawing Sheets

INSTALLATION OF MODULAR UNITS

CAPACITOR VOLTAGE WAVEFORM

CAPACITOR VOLTAGE AND CURRENT WAVEFORM
DURING CAPACITOR DISCHARGE

INSTALLATION OF MODULAR UNITS

INSTALLATION OF MULTI-MODULAR UNITS

SELF-CONTAINED APPARATUS FOR DE-ICING AIRCRAFT SURFACES USING MAGNETIC PULSE ENERGY

TECHNICAL FIELD

This invention relates generally to the art of de-icing aircraft surfaces, such as wings and engine inlets, and more particularly concerns a system for de-icing such aircraft surfaces with magnetic pulse energy.

BACKGROUND ART

It is well known that the accumulation of ice on aircraft surfaces, particularly the leading edges of wings and engine inlet surfaces, is a dangerous condition. A layer of ice on the order of as little as a few centimeters in thickness on the leading edges of aircraft wings, for instance, has been shown to result in flow separation and consequential interruption of lift, possibly even resulting in the crash of the aircraft. At the very least, the additional drag on the aircraft caused by ice results in increased use of fuel and unstabilized flight.

As a result, substantial efforts have been made to prevent the formation of ice on, and/or to remove ice from, such aircraft surfaces. One of the most common methods presently used for ice prevention/removal from leading edge surfaces is heating, by means of bypass techniques using excess heat from the aircraft engines. Although bypass systems are reasonably effective, they do have some disadvantages. A bypass system requires a separate structure to route the heated air, which adds additional weight to the aircraft. The air from the engines must first be cooled and the system for doing this is rather complex. Further, bypass de-icing with heated air increases fuel use and thus increases cost on this basis as well. In addition, the use of bypass techniques will likely become undesirable as newer engines are developed which produce less excess heat and have lower core temperatures. Stability problems may result if additional heat is drawn from the engines for bypass, due to further reduction in core temperatures.

As an alternative to the engine bypass heating system, an electromagnetic impulse system was developed to mechanically force the ice from aircraft surfaces. In such a system generally, a bank of high voltage capacitors is discharged through a coil which is positioned adjacent the interior of a leading edge surface of the aircraft, such as a wing, resulting in a rapidly forming and collapsing magnetic field which induces eddy currents into the thin metal skin of the aircraft. The magnetic field creates a repulsive force which is quite large but has a very short duration. This results in a rapid acceleration of the metal skin of the aircraft, although the actual movement of the skin is small, which acts to debond and in essence "shatter" the ice from the aircraft surface.

An early disclosure of such a system is found in British Patent Specification No. 505,433, dated May 5, 1939, to Goldschmidt. To the best of applicant's knowledge, such a system has never been implemented. U. S. Pat. No. 3,549,964 to Levin et al, dated 22 December 1970, is a later example of continuing work in this area, referred to generally as electro-impulse de-icing or EIDI. Additional research into EIDI techniques has been done at Wichita State University in Wichita, Kansas, as well as by individual aircraft companies. However, all such systems are characterized by the use of relatively high voltage, i.e. at least 800V–2000V and correspondingly large (and complex) power supplies. In combination with the necessary cables, such a system is relatively heavy. Typically, only a very few power supplies are used, such as one or two for each wing, in combination with a plurality of individual coil units positioned at selected locations along the interior surface of the wing. The coil units are arranged in parallel, and each coil unit has its own control switch. The power supplies are typically positioned in the main fuselage portion of the aircraft, with long cables connecting the power supplies to the coil units.

Such an approach has significant disadvantages. First, the use of high voltage has inherent risks, including the risk of fire/explosion due to arcing in those areas where fuel could be present. In addition, such a system is relatively bulky and heavy, and requires the use of transformers or other inductive devices, as well as timing circuits and multiplexing circuits. The failure of any one of the cables or switches in the system will disable the associated power supply and hence at least a significant part of the EIDI system. Still further, such a system is also typically quite expensive.

As a result, even though EIDI technology has been shown generally to have substantial technical merit, it has not been widely used commercially.

DISCLOSURE OF THE INVENTION

Accordingly, the present invention is an electromagnetic de-icing system, which is useful in aircraft, wherein the system includes at least one self-contained electromagnetic de-icing module which in turn includes an actuator coil which in the use of the system is positioned in close proximity to the interior side of the aircraft surface to be de-iced, such as for example the leading edge of a wing of an aircraft, wherein the coil has a surface configuration which is substantially the same as the shape of the aircraft surface to be de-iced. The system also includes a source of stored charge which defines a selected voltage, wherein the stored charge will produce a current pulse through the coil when the source of stored charge is connected to the coil. The system also includes means located close to the coil and responsive to the aircraft supply voltage for charging the source of stored charge and further includes control means for selectively connecting the source of stored charge to the coil, thereby producing a current pulse in the coil which in turn produces a magnetic force pulse which is large enough, which induced in the aircraft surface, to debond ice therefrom.

BEST MODE FOR CARRYING OUT THE INVENTION

Figure 1:
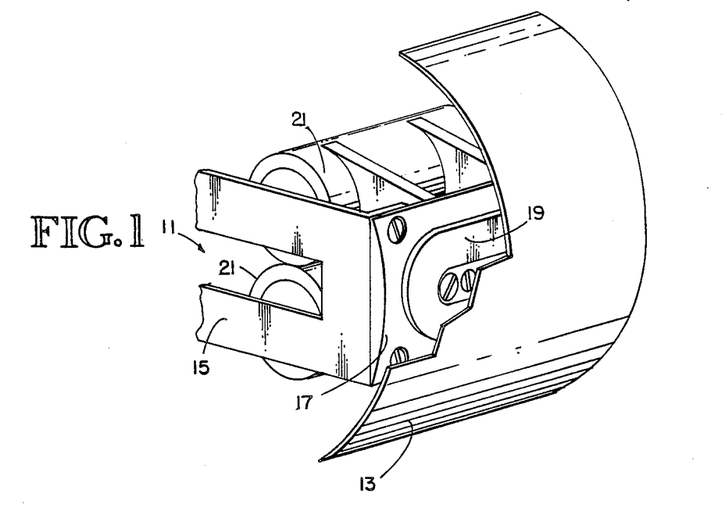
FIG. 1 is a partially cutaway view showing the self-contained de-icing system of the present invention arranged relative to a portion of the leading edge of an aircraft wing.

Referring to FIG. 1, the present invention is directed toward a self-contained, modular de-icing unit which is particularly adapted for use with thin metal aircraft surfaces. This includes the leading edge of the wings of the aircraft, as well as the inlet surfaces around the engines. In the self-contained, modular unit of the present invention, conventional aircraft power, i.e. 208 volts, which is obtained from an onboard aircraft voltage bus, is used for the input power to the individual modules, shown generally at 11 in FIG. 1. The module 11 is shown positioned immediately behind the leading edge of a portion of a thin walled metal aircraft wing 13. The module is supported by end supports 15—15 positioned at opposite ends of the module (only one of which is visible in FIG. 1), to which the back plate 17 of the coil is attached, by means of screws or the like. An oval coil winding 19 is positioned on the front surface of the plate 17, immediately adjacent the interior surface of wing portion 13.

A power supply (not shown in FIG. 1 but shown in other figures and explained in more detail below) receives power from the aircraft power system and charges electrolytic capacitors 21—21 to a level of about 450 volts DC in the preferred embodiment, although the simple voltage doubler system used in the preferred embodiment is capable of charging the capacitors to approximately 590 volts. A switching network discharges the capacitors 21 through the coil 19 at particular times, producing a 2.2 KA current with a very fast rise time, on the order of 125 microseconds.

The current through the coil creates a magnetic field and establishes eddy currents in the thin metal skin of the aircraft wing. The repulsive force created between the coil and the wing, due to the fast rise time and relatively high amplitude of the current through the coil, produces a rapid acceleration of the the wing surface, although the actual movement of the metal is relatively small, i.e. on the order of 0.1 millimeter. This results in the ice which has been formed on the wing debonding from the wing surface and shattering away from the wing.

Figure 6:
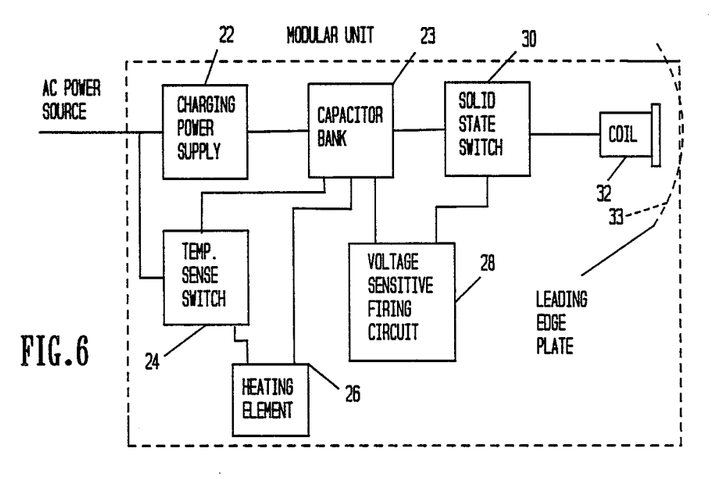
FIG. 6 is a block diagram of the self-contained de-icing system of FIG. 1.

The self-contained, modular unit of the present invention is shown in simplified block diagram form in FIG. 6. As discussed above, power to each modular unit is obtained from the on-board conventional aircraftpower supply (208 volts at 60 or 400 Hz). This 208v supply voltage is applied directly to a power system 22, which charges the capacitor bank 23. An optional temperature sensitive switch 24, such as a bimetallic thermostat or other similar element, controls a heating element 26, which is also optional and which would tend to maintain the temperature of capacitor bank 23 within a proper range, if necessary. The temperature sensitive switch 24 and the heating element 26 may not be necessary in particular embodiments, depending upon the operating characteristics of the capacitors comprising the capacitor bank 23. For instance, some electrolytic capacitors perform capably within a typical icing temperature range of 10 degrees to 32 degrees Fahrenheit without auxiliary heating.

The firing circuit 28 is responsive to the level of voltage on the capacitor bank, and at the selected level, triggers the solid state switch 30, which results in the discharge of the energy stored in the capacitor bank 23 into the coil 32, which in turn produces the magnetic force impulse which causes a mechanical movement of the wing surface 33, breaking the ice.

Figure 2:
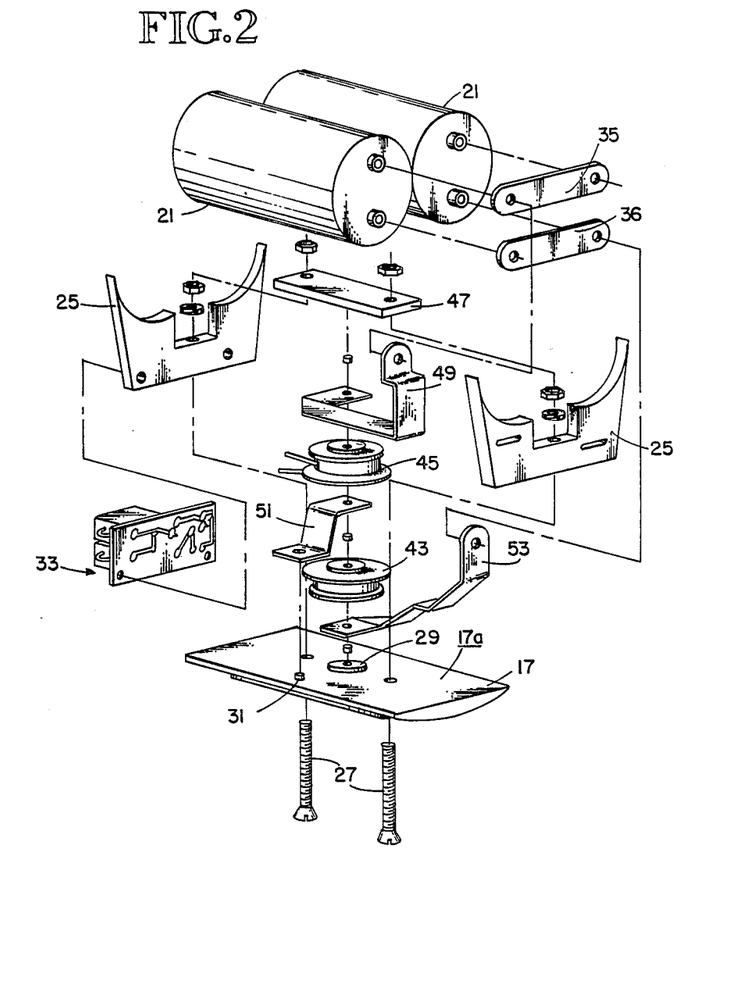
FIG. 2 is an exploded view showing the structural elements of the self-contained de-icing system of FIG. 1.

FIG. 2 shows an exploded and more detailed view of the self-contained de-icing system of the present invention. The two end supports 25—25 (15—15 in FIG. 1) are secured at right angles to the rear surface of electrically insulating coil backing plate 17 by means of bolts 27—27. Extending through the coil backing plate 17 at the rear surface 17a thereof are two electrodes 29 and 31 which are fixed, electrically conducting elements to which the respective ends of coil winding 19, which is wound on the front surface of coil backing plate 17, are connected. The process for manufacture of the coil is described in detail below relative to FIGS. 10–21. Although the apparatus of FIG. 2 shows a single coil, two coils or perhaps more could be positioned in close proximity, such as vertically positioned relative to each other, in particular applications.

Power system 33 is a relatively simple, conventional unit, contained on a card which is secured to one end of one of the capacitor end supports 25—25. Capacitors 21—21 are positioned adjacent each other on end supports 25—25 and are held onto the end supports by means of straps or the like (not shown). Two elongated, electrically conducting, bus bars 35, 36 connect the two capacitors together in parallel. Although the embodiment shown includes two capacitors, the invention is not considered to be limited to two capacitors.

Positioned between the capacitors 21—21 and the rear surface of backing plate 17 are a so-called hockey puk flyback diode 43, a hockey puk silicon controlled rectifier (SCR) 45, and a clamp 47, which holds the elements securely in place relative to the end supports 25—25. The term "hockey puk" as used with respect to elements 43 and 45 is conventional and refers to an element which is flat and shaped like a hockey puck. Other conventional terms for such an element include "press-pak" or "wafer unit".

Conductors 49, 51 and 53, all in the form of elongated metal straps, connect capacitors 21—21 to the hockey puk flyback diode 43 and SCR 45 and the coil electrodes 29 and 31. The hockey puk SCR and flyback diode and strap connectors are frequently encased in a potting material for system reliability and safety.

Figure 3:
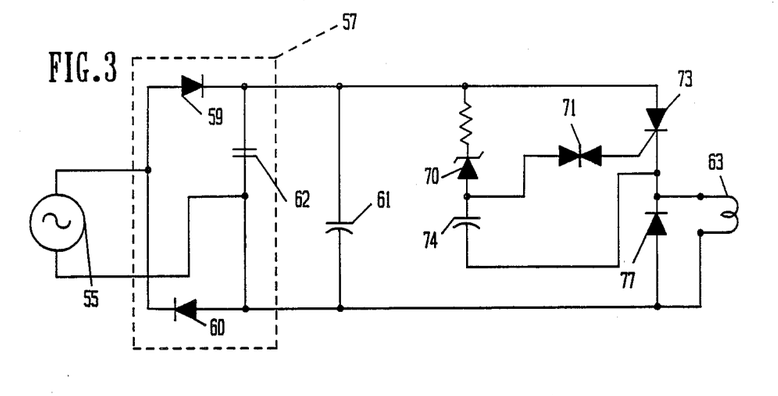
FIG. 3 is an electrical circuit diagram of the self-contained de-icing system of FIG. 1.

The electrical diagram for the self-contained de-icing system of the present invention is shown in FIG. 3. As explained briefly above, the supply voltage for the modular self-contained unit is the standard aircraft voltage of 208 volts (RMS) at 400 hertz or any other selected frequency, such as 60 Hz, shown as signal source 55 in FIG. 3. This signal is obtained from a conventional aircraft voltage bus and is applied in the embodiment shown directly to a diode/capacitor circuit 57 which acts as a voltage doubler, so that at circuit points 59 and 60, the voltage could be as high as 588 volts ($208 \times 1.414 \times 2$). Although the preferred embodiment includes a voltage doubler, other embodiments may not require any greater voltage than the peak of the actual aircraft supply voltage, 295 volts ($208 \times 1.414$) as the charge voltage. If such a low charge voltage is adequate, an improved power factor can be achieved by replacing the circuit 57 shown in FIG. 3 with a full wave bridge circuit, in which the current limiting capacitor 62 is on the AC side of the bridge. In fact, it appears that adequate force to accomplish de-icing can be obtained with a charge voltage of 295 volts. Such a system would of course have all the benefits of such a relatively low voltage.

It is important to note that the aircraft supply voltage is applied directly to the doubler circuit, and not to any auxiliary power conditioning equipment such as transformers, inductors, switching power supplies, etc. The apparatus of the present invention is thus a self-contained unit, requiring only a line connection to the aircraft voltage supply.

The voltage from the voltage doubler circuit 57 in the embodiment shown is applied to the capacitor bank 61, which in the embodiment shown has a value of 1100 microfarads. In the preferred embodiment, the capacitor bank comprises electrolytic capacitors, although other capacitors can be used. The advantage of electrolytic capacitors in the embodiment shown are that they are relatively inexpensive and relatively lightweight. The charge on the capacitors provided by the voltage doubler circuit 57 is used to produce the required current pulse through coil 63, as explained in more detail below.

The system voltage of 450 volts in the embodiment shown is relatively low, significantly below other EIDI systems, and is accomplished without the use of transformers or other inductive devices. Further, the apparatus is basically self-protected, since if a short circuit should occur in the module, the capacitor 62 in the voltage doubler circuit will limit the current drawn from the aircraft power system to only 30–50 milliamps or so. Charging of the capacitors will begin again if and when the short circuit is corrected. If the voltage doubler is not used, it is still important to have a charging circuit which will in effect spread the energy supplied to the capacitor over a reasonable period of time so as to prevent a drain on the aircraft voltage supply system.

The firing circuit includes a zener diode 70 and a diac 71, which is used to fire SCR 73. When the voltage on capacitor 74 rises above the zener voltage for zener diode 70, diac 71 fires SCR 73, which results in the capacitor 61 discharging through coil 63, creating a high current through coil 63. The flyback diode 77 is connected directly across coil 63 and provides a recirculating current path with coil 63, preventing the capacitor bank 61 from going negative, which would result in damage to the capacitors.

Since the zener diode 70 triggers at a preset, known zener voltage, which in the embodiment shown is approximately 450 volts, the firing of the modular unit is in effect self-timing. In the embodiment shown, the timing cycle is approximately 30 seconds. The timing can be easily adjusted, depending upon the value of the doubler capacitor. Complex timing controls and clocks are thus eliminated. Further, since the power system for the unit is located substantially adjacent the coil, the resistance and inductance of the discharge loop are both quite low; in the embodiment shown approximately 200 milohms and less than 40 microhenrys, respectively.

Figure 4:
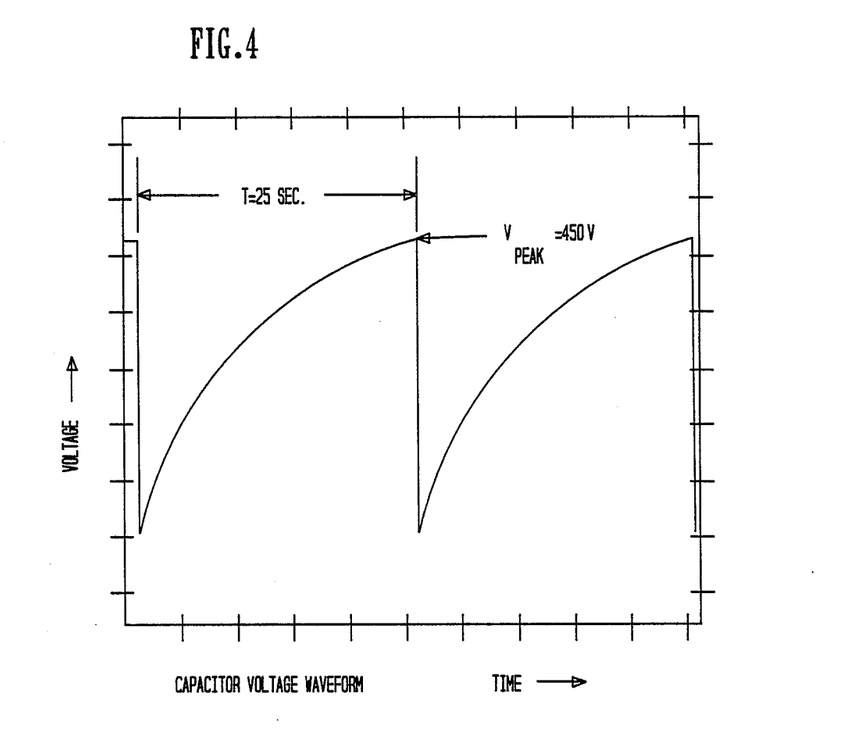
FIG. 4 is a voltage waveform showing the charging/discharging cycle of the capacitors used in the self-contained de-icing system of FIG. 1.

FIG. 4 shows the charging and discharging cycle of the capacitor bank. The capacitors start at a beginning charge point near zero volts, and gradually charge over a period of approximately 25 seconds in the embodiment shown to a peak voltage of 450 volts, at which point the firing circuit triggers the SCR, discharging the capacitor down to near zero volts again. The timing of the charge/discharge cycle is determined by the firing circuit and the voltage on the capacitor, i.e. when the voltage reaches a certain level, which depends upon the value of said certain level as well as the peak voltage being applied, the firing circuit is activated, since the firing circuit is designed to fire at the predetermined level. Hence, the circuit is self-controlled by the charging of the capacitor.

Figure 5:
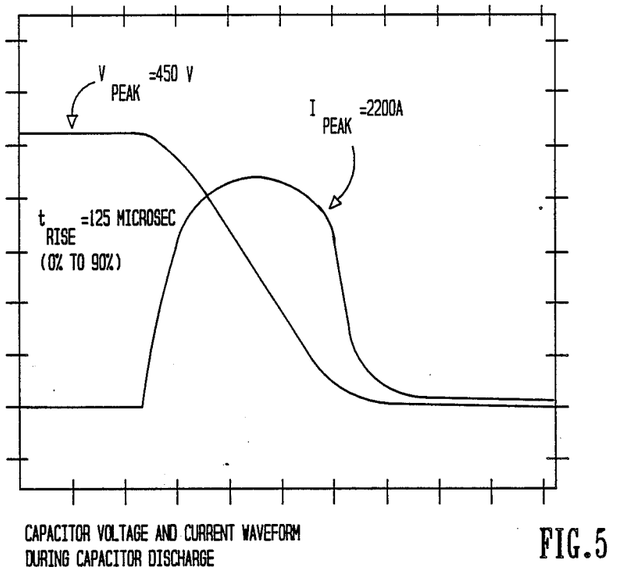
FIG. 5 is a combined voltage and current waveform showing the discharge of the capacitors used in the self-contained de-icing system of FIG. 1.

FIG. 5 shows the discharge of the capacitor bank from 450 volts to zero volts, occurring over a period of approximately 400 microseconds. The current in the discharge circuit, immediately following the actuation of the firing circuit, quickly rises to a peak current of 2200 amperes. In the embodiment shown, the current rise time from zero to an amplitude approximately ninety percent of peak amplitude is 120 microseconds. This fast rise time results in a rapid establishment of the magnetic field and in turn the creation of the repulsive force necessary to debond and shatter the ice from the aircraft surface.

The current pulse through the coil 63 produced by the discharge of the capacitor bank is approximately 2.2 KA, with a rise time of 125 microseconds for 90% of peak current. This results in a peak force of approximately 1600 lbs. It is possible, however, that a somewhat lower current, and a lower power supply voltage, will still be effective to remove ice from aircraft wing surfaces. FIG. 5 shows a sharp drop off in current at the capacitor. The current in the coil, however, will decrease much less rapidly, due to the recirculating action of the flyback diode.

The manufacture of a coil which is useful in the apparatus of the present invention is explained in detail hereinafter. However, it should be noted that the characteristics of the coil are important to the operation of the present invention. For instance, it is very helpful if the impedance of the coil is adjusted or controlled so that a reasonable match results between the discharge time of the capacitor bank and the magnetic diffusion time. Applicant accomplishes this result in a straightforward manner by varying the thickness of the electrically conducting strip used to form the coil winding. Optimum results can be achieved by changing the thickness of the coil windings, which in turn can be readily achieved by the application of the disclosure provided below relative to manufacture of the coil.

Figure 7:
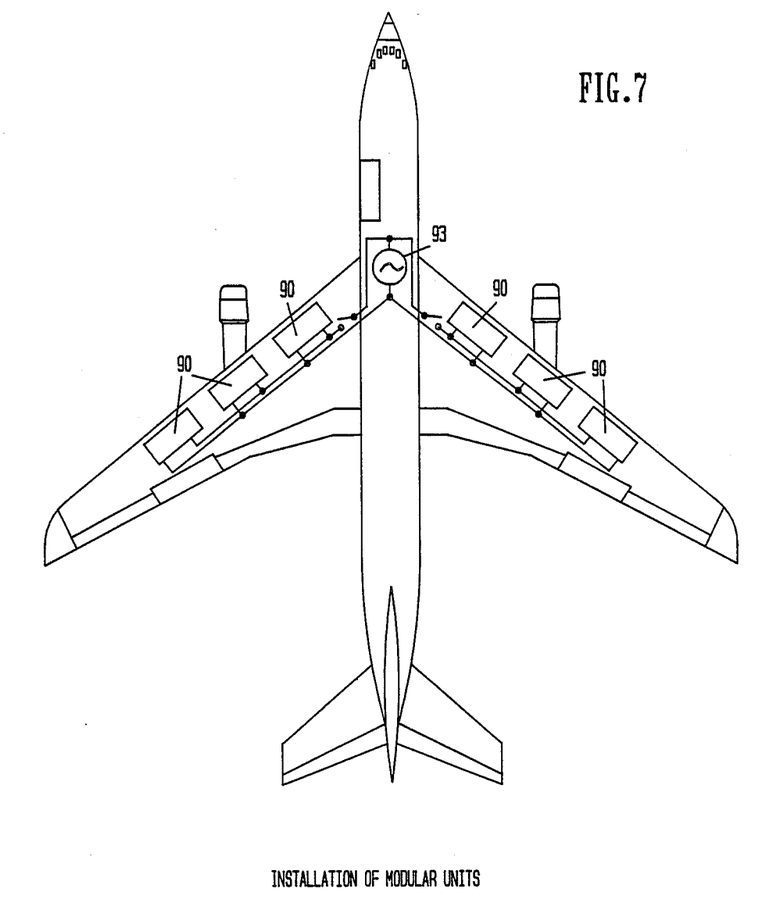
FIG. 7 is a simplified diagram showing the arrangement of a plurality of the de-icing systems shown in FIG. 6 on an aircraft.

FIG. 7 shows an arrangement of several modular units positioned operationally in an aircraft. In one arrangement, the individual units are spaced at 24 inch intervals, along the length of the wing, as well as around the engine inlets. The system is relatively inexpensive, typically substantially less than other competing systems. Large airliners require approximately 80 units. The weight of each individual module would typically be less than 3 pounds. The modular unit of the present invention can also be used in conjunction with conventional de-icing systems, including a heating bypass system. In such a combined system, the modular units of the present invention are used in areas of the aircraft which are not easily accessed by a bypass system, such as the tips of the aircraft wings and certain other remote locations. In this combined arrangement, the modular units of the present invention are in effect an add-on to the conventional system.

Figure 8:
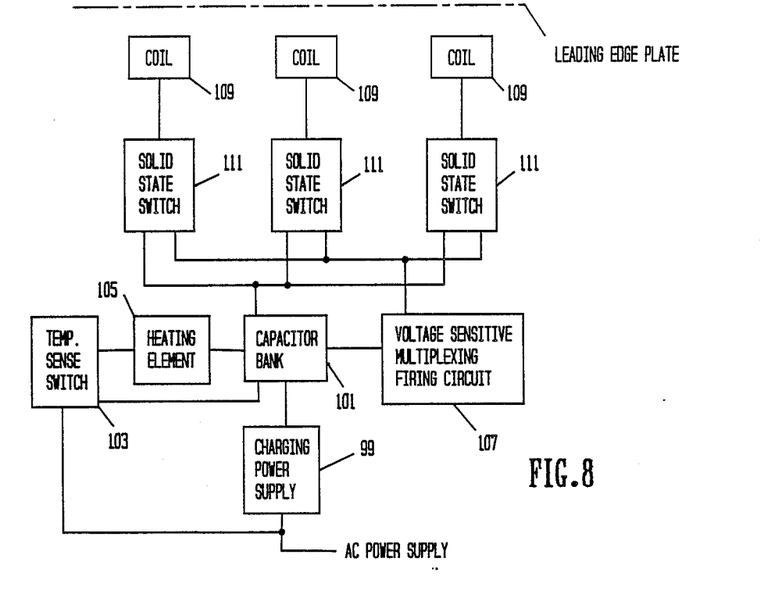
FIG. 8 is a block diagram of an extended self-contained de-icing system which includes several individual coil units.
Figure 9:
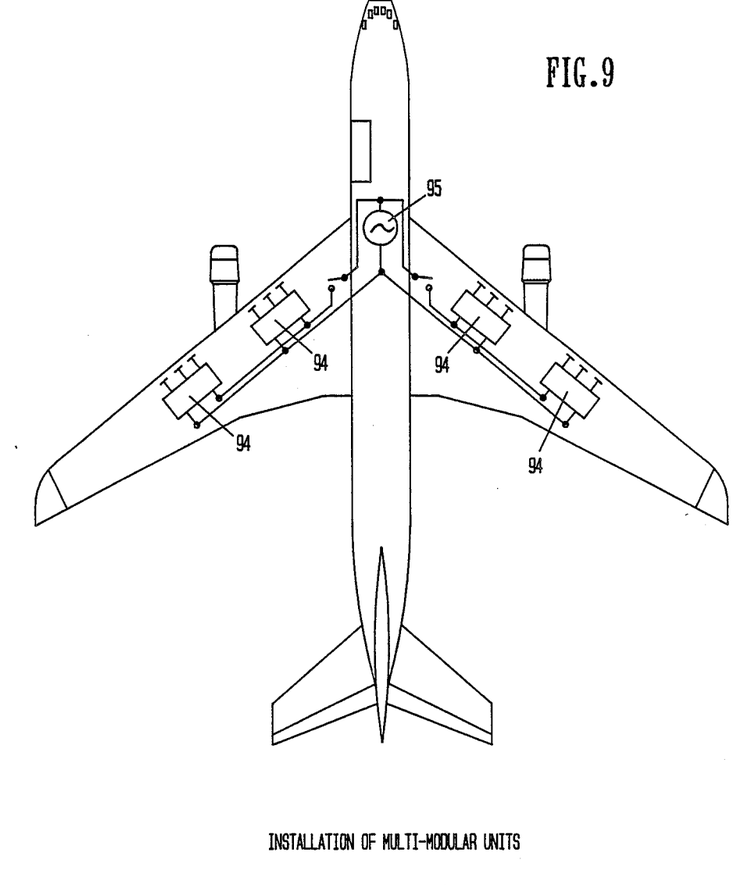
FIG. 9 is a simplified diagram showing the arrangement of a plurality of the de-icing systems shown in FIG. 8 on an aircraft.

FIGS. 8 and 9 show a modification of the self-contained modular unit of the present invention. The modification is an extended modular unit in which a single power supply and associated capacitor bank and firing circuit serve a small plurality, i.e. three or so, individual coils and their associated solid state switches. Referring to FIG. 8, this system, referred to as a multi-modular system or unit, again receives power to 208 volts AC, 400 hertz or 60 hertz, from the aircraft power supply along a conventional voltage bus. This supply voltage is applied directly to the individual modules, which includes the power system 99 and the capacitor bank 101 as well as a temperature sensing switch 103 and a heating element 105, which are all found in the basic modular unit of FIG. 6. In addition, however, the central portion of the multi-modular unit includes a multiplexing firing circuit 107, which controls the sequential firing of the three solid state switches which in turn, respectively, control one of the coil portions of the multi-modular unit, each of which includes a coil 109 in addition to the solid state firing switch 111. The coil 109 and switch 111 are identical to those used in the basic modular unit of FIG. 6.

In operation, the solid state switches of the respective coil portions are sequentially triggered by the firing circuit 107, resulting in the energy from the capacitor bank 101 being available to each coil portion in turn, when its associated switch is activated.

The multi-modular system is shown arranged on an aircraft in FIG. 9, with successive multi-modular systems being positioned along each wing. Such a system retains virtually all of the advantages of the basic modular system, but is somewhat lighter since it requires fewer capacitors. Relatively close spacing, i.e. within several feet, is maintained between the capacitor bank and the individual coils, although not as close as the single module unit. A relatively low capacitor charge voltage is therefore typically still adequate.

Hence, a self-contained modular electrical impulse de-icing system has been disclosed which corrects many of the problems of the prior art, and which at the same time is relatively lightweight and inexpensive compared to present electrical impulse de-icing systems. In addition, because the voltage is relatively low, i.e. approximately 450 volts instead of 800-2,000 volts, there is much less possibility of shorts or arcing within the wing, thereby significantly reducing the potential hazards of the situation.

The fact that the present invention is modular, i.e. self-contained, results in the significant advantage of inherently high reliability, and its relative simplicity makes maintenance relatively easy and straightforward.

The process for making the coil which is used in the self-contained modular de-icing system of the present invention is shown in FIGS. 10 through 21. The coil is useful, however, in other applications beside the modular de-icing system described herein.

Figure 10:
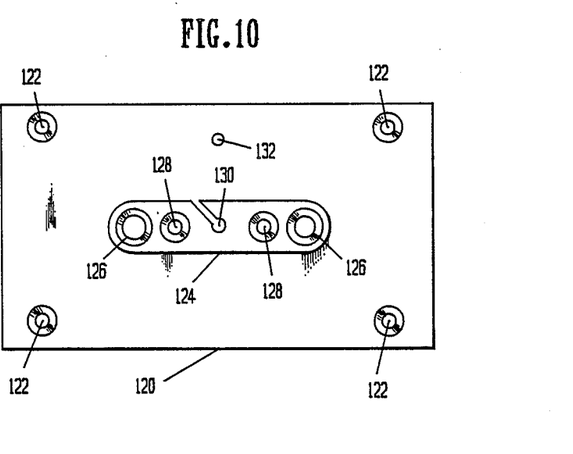
FIGS. 10 and 11 snow the first step in the manufacture of a coil useful in the self-contained de-icing system of the, present invention.
Figure 11:
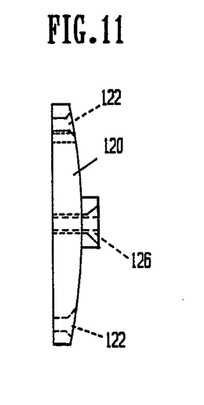

Referring to FIGS. 10 and 11, the coil in the embodiment shown includes a fiberglass backing plate 120. In the embodiment shown, the outline of the backing plate is rectangular, approximately 5 ½ inches by 3 inches. Mounting holes 122-122 are machined in each corner to receive flathead screws. The rear surface of the fiberglass backing plate is flat, while the front surface is curved, the degree of curvature being selected according to the use for the coil. A major feature of the completed coil described herein is the fact that the coil winding itself, including the front surface thereof, is curved, without the necessity of machining. In the present coil, the backing member has the same desired radius of curvature as that for the coil winding.

On the front of the backing plate, located approximately central thereof, is a raised oval island 124 which in the embodiment shown is approximately 3/16 inches high, 3 inches long, and ¾ inches wide, the island being radiused at each end, as shown. Near the opposite ends of the island 124 are two openings 126—126 which accommodate bolts which secure the capacitor end supports to the backing plate. Two other openings 128—128, which are located slightly inboard of openings 126—126, accommodate bolts for the purpose of securing the island to the backing plate. At the end of the first step in the coil manufacturing process, the coil back plate and island 24 are complete.

Figures 12, 13, 14:
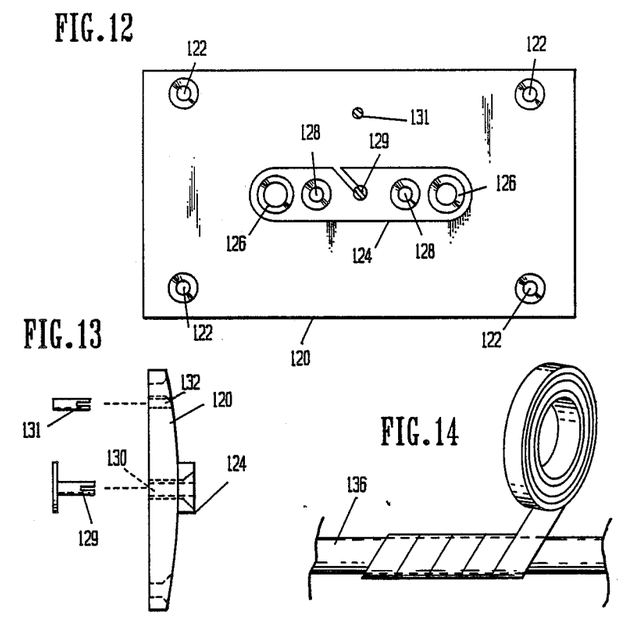
FIGS. 12 and 13 show a second step in the manufacture of such a coil.
FIG. 14 shows the third step in the manufacture of such a coil.

A central smaller opening 130 in island 24, and a further opening 132, which is off the island 124 in the direction of one longitudinal edge of the backing plate and at the point where the coil terminates, accommodate termination electrodes 129,131, as shown in FIG. 12.

In the second step of the process, the electrodes 129,131 are press fitted from the back surface of the backing plate through openings 130 and 132, respectively. The coil electrodes are typically made of copper and are machined to fit the openings. The top end of each electrode, which is adjacent the front surface of the backing plate following proper fitting of the electrodes, is slotted to accept the respective ends of the coil and for soldering thereof.

The copper strip 136 for the formation of the actual coil is partially shown in FIG. 14. In the embodiment shown, the copper strip is 3/16 inches wide, a total of 178 inches long, and 0.025 inches thick, although the length and width of the copper strip will vary depending upon the coil application. As discussed above, the thickness of the strip is a significant controllable parameter relative to impedance matching of the coil to the remainder of the system. The copper strip 136 is spiral wrapped with one thickness of continuous, electrically insulating fiberglass tape 138. The wrapping is edge to edge, without any overlap.

Figure 15:
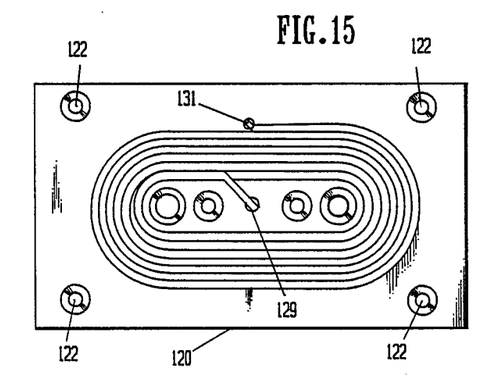
FIGS. 15 and 16 show the fourth step in the manufacture of such a coil.

One end of the fiber glass wrapped copper strip is then fitted into the slot in electrode 129 in the center of the island 124, where it is soldered. The remainder of the copper strip is then wound initially around the island as shown, forming the first winding, and then for successive windings, until the complete coil is formed. Since island 124 is oval, the completed coil is that same shape as well. It should be understood, however, that the configuration of the coil can be varied in accordance with the desired use of the coil.

Figure 16:
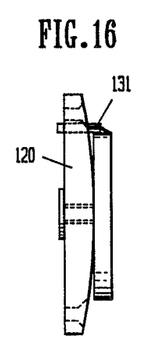

At the conclusion of this step of the process, the coil will be flat and hence will not completely abut the front surface of the backing plate, as shown in FIG. 16. The free end of the copper strip is fitted into the slot in outer electrode 131 and soldered.

Figures 17, 18:
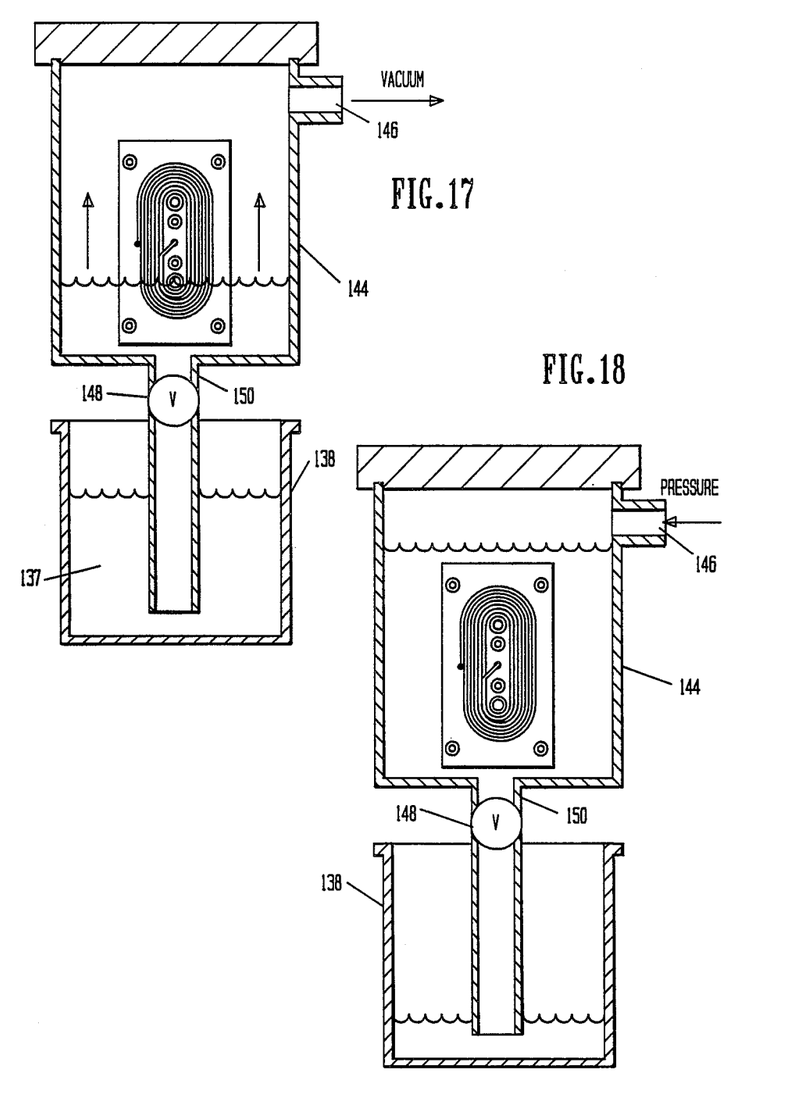
FIG. 17 shows the fifth step in the manufacture of such a coil.
FIG. 18 shows the sixth step in the manufacture of such a coil.

FIG. 17 shows the next step in the process, which involves the placement of the coil and the backing plate in a vacuum/pressure chamber 144. Conventional liquid resin 137 is contained in the resin reservoir 138 beneath the chamber 144. Resin in reservoir 138 is vacuum-infused into chamber 144 by thoroughly removing the air in the chamber through opening 146. This continues for a substantial period of time, such as for ½-1 hour, to insure removal of all the air in the chamber. This also insures that there are no bubbles in the resin as well. Connecting line 150 connects reservoir 138 with chamber 144. A control valve 148 is positioned in the line 150 which when open permits communication between resin reservoir 138 and chamber 144. There should be sufficient resin in reservoir 138 that the lower end of line 150 is not exposed when the resin in chamber 144 covers the coil, as shown in FIG. 18.

When there is sufficient resin in vacuum/pressure chamber 144 to completely cover the coil and the backing plate, the valve 148 in connecting line 150 is closed. After a period of vacuum, chamber 144 is then pressurized, again through opening 146. In the embodiment shown, the pressure is 100 PSI. This pressure forces the resin in chamber 144 into close and intimate contact with the entire surface of each turn of the coil, as well as the fiberglass wrap between each turn.

Figure 19:
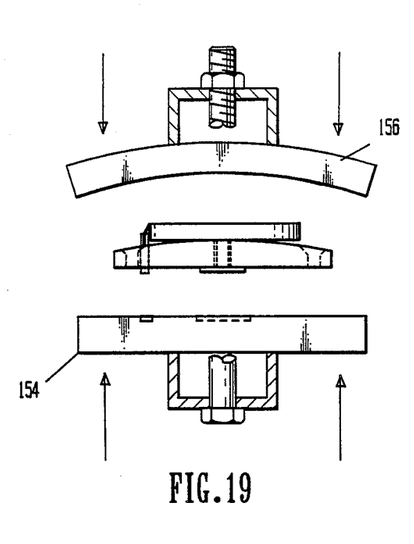
FIG. 19 shows the seventh step in the manufacture of such a coil.
Figure 20:
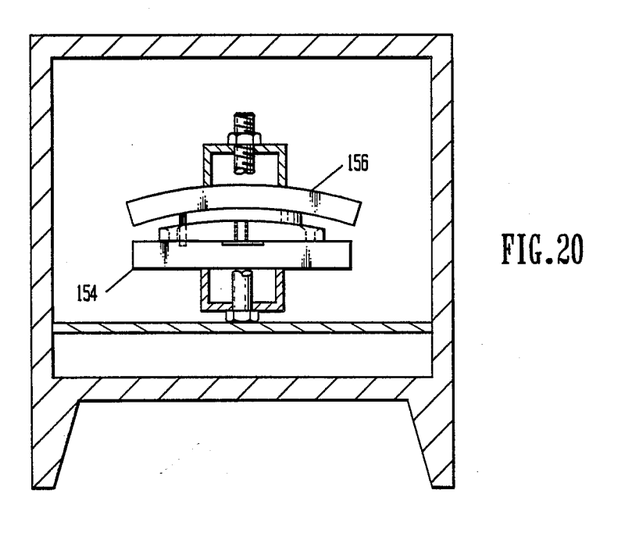
FIG. 20 shows the eighth step in the manufacture of such a coil.
Figure 21:
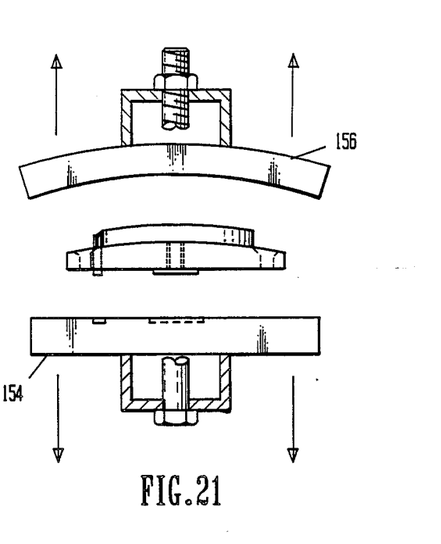
FIG. 21 shows the ninth step in the manufacture of such a coil.

The next step in the process is shown in FIG. 19, and is the initial clamping step. The coil is forced into a curve by a fixture which comprises a rear flat mold 154 and a front curved mold 156 which has a desired radius. The radius of the curved mold 156 typically is identical to the radius of the front surface of the backing plate, and is matched to the curvature of the aircraft surface. The heretofore flat coil and the associated backing plate are positioned between the flat and curved molds, with the flat mold 154 abutting the flat back surface of the backing plate, and the curved mold 156 abutting the flat front surface of the coil. Force is applied on both the flat and curved molds in the direction of the coil, forcing the coil into the curved shape of the mold 156. The molds are held in this position by the clamping force produced by the fixture, and the combination is placed in an oven, as shown in FIG. 20, where the coil is backed at a temperature of approximately 325 degrees Fahrenheit for 8 hours. After the baking cycle is complete, the combination is removed from the oven, allowed to cool, and the molds removed, as shown in FIG. 21. The completed resulting coil is then cleaned and otherwise prepared for actual use.

By virtue of the above process, the finished coil has a curved surface of selected configuration. Such coils do not require machining, or other extensive working to maintain their curvature.

Although preferred embodiments of the inventions have been disclosed herein for illustration, it should be understood that various changes, modifications and substitutions may be incorporated in such embodiments without departing from the spirit of the inventions as defined by the claims which follow.

I claim:

1. An electromagnetic de-icing system particularly useful for aircraft, comprising:
    a plurality of individual, self-contained electromagnetic de-icing modules, connected in parallel, each de-icing module in turn comprising:
    an actuator coil positioned in close proximity to an interior side of an aircraft surface to be de-iced, such as a leading edge of a wing of an aircraft, the actuator coil having a surface configuration which is substantially the same as the shape of the aircraft surface to be de-iced;
    a power supply associated with said actuator coil, located in the immediate vicinity of and in a modular relationship with said actuator coil, each power supply in turn comprising:
    a source of stored charge defining a selected voltage, said stored charge being sufficient to produce a current pulse through said actuator coil when said source of stored charge is connected thereto, means responsive to the aircraft supply voltage for charging the source of stored charge, and control means for selectively connecting the source of stored charge to the actuator coil, thereby producing a current pulse in the actuator coil which produces a magnetic force which is large enough, when induced in the aircraft surface, to de-bond ice therefrom.

2. A system of claim 1, wherein the aircraft supply voltage is the conventional on-board voltage supply of the aircraft, obtained from a conventional aircraft voltage bus.

3. A system of claim 1, wherein said source of stored charge comprises at least one electrolytic capacitor.

4. A system of claim 1, wherein the selected voltage is no greater than approximately 600 volts.

5. A system of claim 2, wherein said charging means comprises a power supply means which includes a voltage doubler circuit, comprising a pair of diodes and at least one capacitor, which in operation substantially increases the voltage level of the aircraft voltage supply.

6. A system of claim 1, wherein the source of stored charge comprises at least one capacitor and wherein the impedance of the actuator coil is such that the discharge time of the capacitor is substantially matched to the magnetic diffusion time of the system.

7. A system of claim 1, wherein the system, including the charging means, is characterized by an absence of inductors.

8. A system of claim 3, wherein the control means includes an electronic switch which when activated connects the capacitor to the actuator coil, and further includes a flyback diode to prevent the capacitor from discharging to a negative voltage.

9. A system of claim 8, wherein the electronic switch and the flyback diode are mounted in the immediate vicinity of the actuator coil.

10. A system of claim 8, wherein said control means includes means for activating the electronic switch upon sensing of a selected voltage on the capacitor, so that the charge/discharge cycle of the capacitor is self-determined.

11. A system of claim 1, wherein the loop resistance of the system is less than 200 milohms and the loop inductance is less than 40 microhenrys.

12. A system of claim 1, including at least two actuator coils positioned in close proximity to each other.

13. A system of claim 1, including at least three spaced actuator coils and means for sequentially connecting the source of stored charge to said three actuator coils.

* * * * *